United States Patent
Lee et al.

(10) Patent No.: US 8,292,783 B2
(45) Date of Patent: Oct. 23, 2012

(54) METHOD AND APPARATUS FOR CONTROLLING A TORQUE CONVERTER CLUTCH

(75) Inventors: Chunhao J. Lee, Troy, MI (US); Kumaraswamy V. Hebbale, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 18 days.

(21) Appl. No.: 13/041,527

(22) Filed: Mar. 7, 2011

(65) Prior Publication Data
US 2011/0160020 A1    Jun. 30, 2011

Related U.S. Application Data

(62) Division of application No. 11/535,535, filed on Sep. 27, 2006, now Pat. No. 7,988,597.

(51) Int. Cl.
*F16H 61/58* (2006.01)
(52) U.S. Cl. .................................................. 477/64
(58) Field of Classification Search ............ 477/54, 477/62, 64, 169, 176
See application file for complete search history.

(56) References Cited

U.S. PATENT DOCUMENTS

| 5,484,354 | A |  | 1/1996 | Vukovich et al. |
| 5,531,302 | A |  | 7/1996 | Koenig et al. |
| 2007/0287594 | A1 | * | 12/2007 | DeGeorge et al. ............ 477/176 |
| 2008/0076635 | A1 |  | 3/2008 | Lee et al. |

OTHER PUBLICATIONS

U.S. Appl. No. 13/112,094, filed May 20, 2011, Lee et al.
U.S. Appl. No. 12/651,525, Otanez et al.

* cited by examiner

*Primary Examiner* — David D Le
*Assistant Examiner* — Derek D Knight

(57) ABSTRACT

A method for controlling torque transmitted between an internal combustion engine and a torque transmission device includes controlling actuation of a torque converter clutch device effective to maintain an engine output within a predetermined range when an input to the transmission is less than a threshold, and controlling actuation of the torque converter clutch device effective to maintain a relative speed across the torque converter substantially at a predetermined magnitude when the input to the transmission is greater than the threshold.

7 Claims, 4 Drawing Sheets

PRIOR ART BASE LINE DATA

METHOD AND APPARATUS FOR CONTROLLING A TORQUE CONVERTER CLUTCH

CROSS REFERENCE TO RELATED APPLICATIONS

This application is a divisional application of U.S. application Ser. No. 11/535,535, filed on Sep. 27, 2006, which is incorporated herein by reference.

TECHNICAL FIELD

This invention pertains generally to torque transmission devices, and more particularly to controlling a clutch for a torque converter device.

BACKGROUND OF THE INVENTION

A torque converter is typically placed between an internal combustion engine and an automatic transmission device and operative to transmit torque therebetween, using an impeller and a turbine device in a fluidic medium. A torque converter clutch typically comprises a pressurized fluid-actuated friction device engageable to mechanically couple the impeller, receiving input from the engine, and the turbine, having an output to the transmission. In a typical application, the clutch can be fully released, actuated in a slip mode, and fully engaged, i.e. locked. When the clutch is fully released, there is unrestrained slippage between the impeller and the turbine, and torque is transmitted therebetween based upon the flow of hydraulic fluid between the impeller and the turbine. When the clutch is actuated in the slip mode, torque is transmitted between the impeller and the turbine through the flow of hydraulic fluid therebetween and controlling pressure of hydraulic fluid to the actuated clutch, and typically there is a difference in rotational speeds between the impeller and the turbine, i.e., a relative speed. When the clutch is fully released, or actuated in the slip mode, torque perturbations between the engine and the transmission resulting from either engine operation or driveline dynamics are absorbed in the fluid of the torque converter.

When the clutch is fully engaged, the rotational speeds of the impeller and the turbine are the same, and torque is transmitted between the impeller and the turbine through the actuated torque converter clutch. When the torque converter clutch is fully engaged, a range of engine torque perturbations or torsionals, typically in the range of 2 to 6 Hz, are passed directly through the clutch to the vehicle drivetrain, producing pulsations therein when not properly damped. Other torsionals, typically those above about 20 Hz, are absorbed in a torsional damper device, which is an element of the torque converter. Thus, the action of completely locking the torque converter clutch is often restricted to specified vehicle operating conditions to minimize the effects on noise, vibration and harshness (NVH). As a result, potential efficiency gains afforded by fully engaging the torque converter clutch are only realized over a portion of the range of vehicle operation.

To overcome the disadvantages of torque converter clutch engagement, it has been proposed to operate the clutch in a slipping mode wherein a predetermined amount of slippage between the torque converter impeller and turbine is permitted for regulating the torque capacity of the clutch. In any such system, the objective is to isolate engine torque perturbations in the torque converter while passing steady state engine torque at a slip rate that provides improved torque converter efficiency, leading to improved fuel economy. Previous control systems proposed to manage clutch slippage have been disclosed, for example, in U.S. Pat. No. 4,582,185 to Grimes et al., issued Apr. 15, 1986, and U.S. Pat. No. 5,484,354, to Vukovich, et al., issued Jan. 16, 1996, each of which is assigned to the assignee of the present invention. The advent of cylinder deactivation systems has further emphasized a need to effectively manage operation and control of a torque converter clutch in a modern powertrain system.

There is a need to expand range of usage of the torque converter clutch in order to gain efficiency benefits therefrom without adversely affecting driveability.

SUMMARY OF THE INVENTION

A method for controlling torque transmitted between an internal combustion engine and a torque transmission device includes controlling actuation of a torque converter clutch device effective to maintain an engine output within a predetermined range when an input to the transmission is less than a threshold, and controlling actuation of the torque converter clutch device effective to maintain a relative speed across the torque converter substantially at a predetermined magnitude when the input to the transmission is greater than the threshold.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
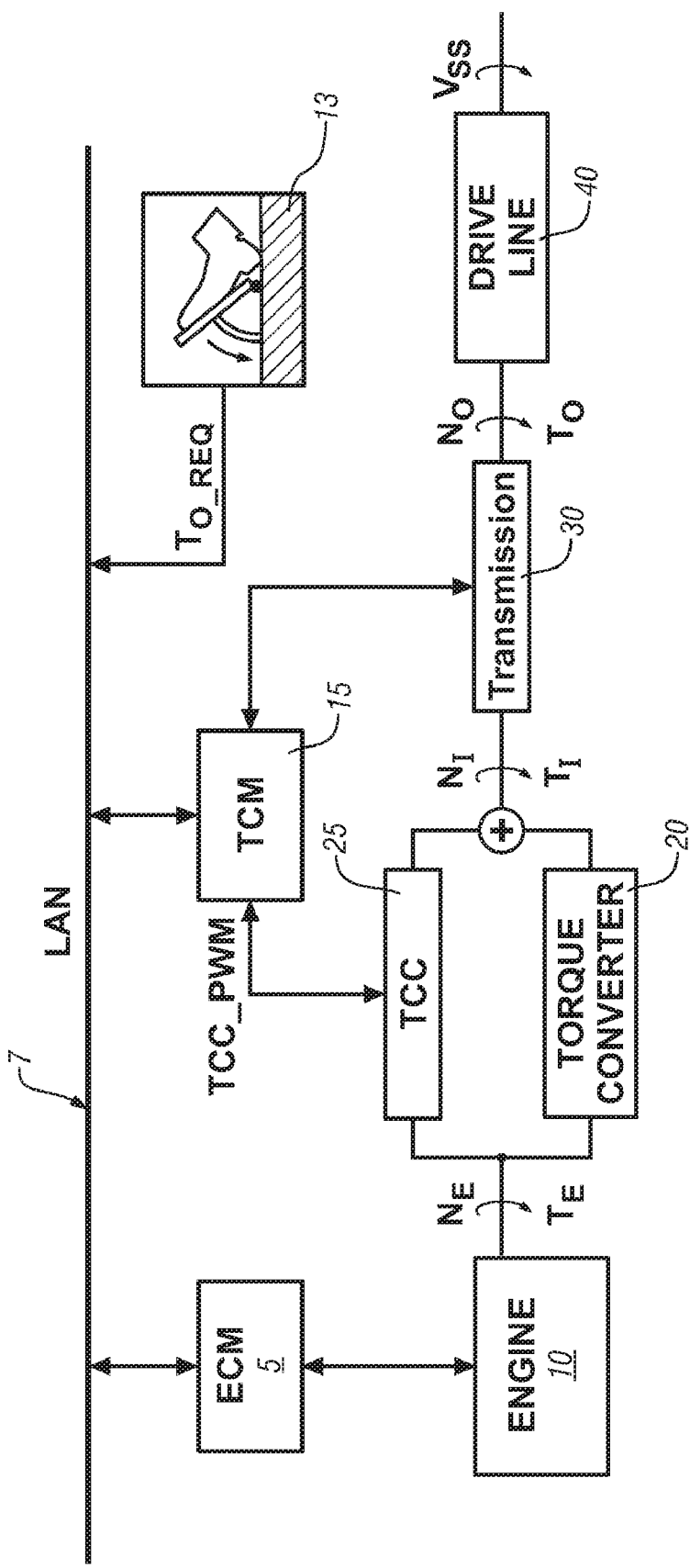
FIG. 1 is a schematic diagram of an exemplary system, in accordance with the present invention.

Referring now to the drawings, wherein the showings are for the purpose of illustrating the invention only and not for the purpose of limiting the same, FIG. 1 depicts an engine 10, transmission 30, driveline 40, and control system which have been constructed in accordance with an embodiment of the present invention. The exemplary engine 10 preferably comprises any one of various multi-cylinder internal combustion engine configurations controlled by an engine control module (ECM) 5 based upon a torque request $T_{O\_REQ}$ input from a user interface 13 which provides one or more operator inputs, e.g. from a throttle pedal device and a brake pedal device. A rotatable output shaft of the engine is connected to an input shaft of a fluidic torque converter 20 which is preferably disposed within a housing of transmission 30.

The torque converter 20 includes a torque converter clutch (TCC) 25, which is operative to transmit torque input from the input shaft from the engine, when engaged. As depicted in FIG. 1, engine power output, depicted as engine rotational speed, $N_E$, measured in revolutions per minute (rpm) and engine torque, $T_E$, measured in Newton-meters (N-m) can be transmitted across either or both the torque converter 20 and the TCC 25 to the input shaft of the transmission 30. The input shaft to torque converter 20 is connected to an impeller or input member (not shown) of the torque converter 20. A turbine or output member (not shown) of the torque converter 20 is rotatably driven by the impeller by means of fluid transfer therebetween, and connects to and rotatably drives a shaft input to the transmission 30, which, as depicted in FIG. 1, has inputs of transmission input speed, $N_I$ and torque, $T_I$. The torque converter clutch (TCC) assembly 25 preferably comprises a hydraulically-actuated clutch device that is selectively controlled to engage the impeller and the turbine. An exemplary TCC assembly 25 is described in detail in U.S. Pat. No. 5,484,354, to Vukovich, et al., issued Jan. 16, 1996, which is assigned to the assignee of the present invention. The TCC is preferably controlled by a transmission control module (TCM) 15 operative to generate a pulse-width-modulated (PWM) signal having a variable duty cycle effective to control hydraulic pressure thereat.

In operation, the torque converter 20 and TCC 25 typically operate as follows. The TCC can be fully released, actuated in a slip mode, and fully engaged, i.e. locked. When the clutch is fully released, there is unrestrained slippage between the impeller and the turbine, and torque is transmitted therebetween based upon the flow of hydraulic fluid between the impeller and the turbine. When the TCC is actuated in a slip mode, the TCC 25 is actuated but there is slippage between the impeller and the turbine, with a resulting difference in rotational speeds between the impeller and the turbine. Torque is transmitted between the impeller and the turbine through the flow of hydraulic fluid and through the actuated TCC 25, with slippage in the system which absorbs engine and driveline perturbations. When the TCC 25 is locked, the rotational speeds of the impeller and the turbine are the same, and torque is transmitted between the impeller and the turbine through the actuated clutch. The TCC 25 is controlled by a PWM signal from the TCM 15, such that when the PWM duty cycle is relatively low, the clutch pressure is low, and the torque converter functions as a normally fluidic pump device, as previously described. When the PWM duty cycle is increased, hydraulic pressure increases, increasing clutch pressure and mechanically engaging the impeller and the turbine devices, with a level of slippage therebetween ($N_E$-$N_I$) based upon the clutch pressure, engine torque and speed, and other operating conditions. Overall actuation of the TCC 25 is generally known and not discussed in detail herein.

The output from the torque converter 20, comprising torque $T_I$ and rotational speed $N_I$, is transmitted through the turbine/impeller and the TCC 25, is input through a shaft to the transmission 30. The transmission 30 comprises a gear set suitable for providing a plurality of fixed gear ratios between the torque converter output shaft and an output shaft of the transmission. The transmission 30 preferably includes a hydraulic pump and circuit operative to supply pressurized hydraulic fluid to various devices in the transmission to effect operation of the transmission and the torque converter. The output shaft of the transmission is characterized by an output speed, $N_O$, and output torque $T_O$, and is operatively connected to driveline 40 for delivering tractive torque to one or more vehicle wheels, characterized by a vehicle speed parameter, $V_{SS}$.

The system includes sensing devices operative to sense operator demands, and operating conditions of the engine and transmission devices. Operator demands, depicted as the torque request $T_{O\_REQ}$ input from the user interface 13 in FIG. 1, typically comprise demands for torque in the form of acceleration and braking using inputs from an accelerator pedal and a brake pedal. Engine operating conditions are determined using sensing devices are installed on the engine to monitor physical characteristics and generate signals which are correlatable to engine and ambient parameters, specifically an engine operating point. The engine operating point comprises a measure of engine crankshaft speed output to the transmission ($N_E$) and load (MAP), measurable using, e.g., an intake manifold pressure sensor or a mass air flow sensor. Each of the sensing devices is signally connected to the ECM 5 to provide signal information which is transformed by the ECM to information representative of the respective monitored parameter. It is understood that this configuration is illustrative, not restrictive, including the various sensing devices being replaceable within functional equivalent devices and algorithms and still fall within the scope of the invention. The transmission 30 includes an output speed sensor, typically a variable reluctance transducer, operative to monitor rotational speed, $N_O$, of the output shaft, from which input speed, $N_I$, of the transmission is determined based upon the specific gear ratio (GR) at which the transmission 30 is operating. Alternatively, a sensor can be mechanized in a system to directly monitor transmission input speed, $N_I$.

The control system for operation of the invention described herein comprises elements of an overall vehicle control system, preferably executed as a distributed control module architecture to provide coordinated system control. The ECM 5, TCM 15 and the user interface 13 are each signally connected via a local area network (LAN) 6, which is operative to provide structured signal communication between the various control modules. The ECM and the TCM are each operable to synthesize pertinent information and inputs from the aforementioned sensing devices, and execute algorithms to control various actuators to achieve control targets, including such parameters as fuel economy, emissions, performance, driveability, and protection of hardware. The ECM and TCM are preferably general-purpose digital computers each generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. A set of control algorithms, comprising resident program instructions and calibrations, is stored in ROM and executed to provide the respective functions of each computer. Algorithms are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Figure 2:
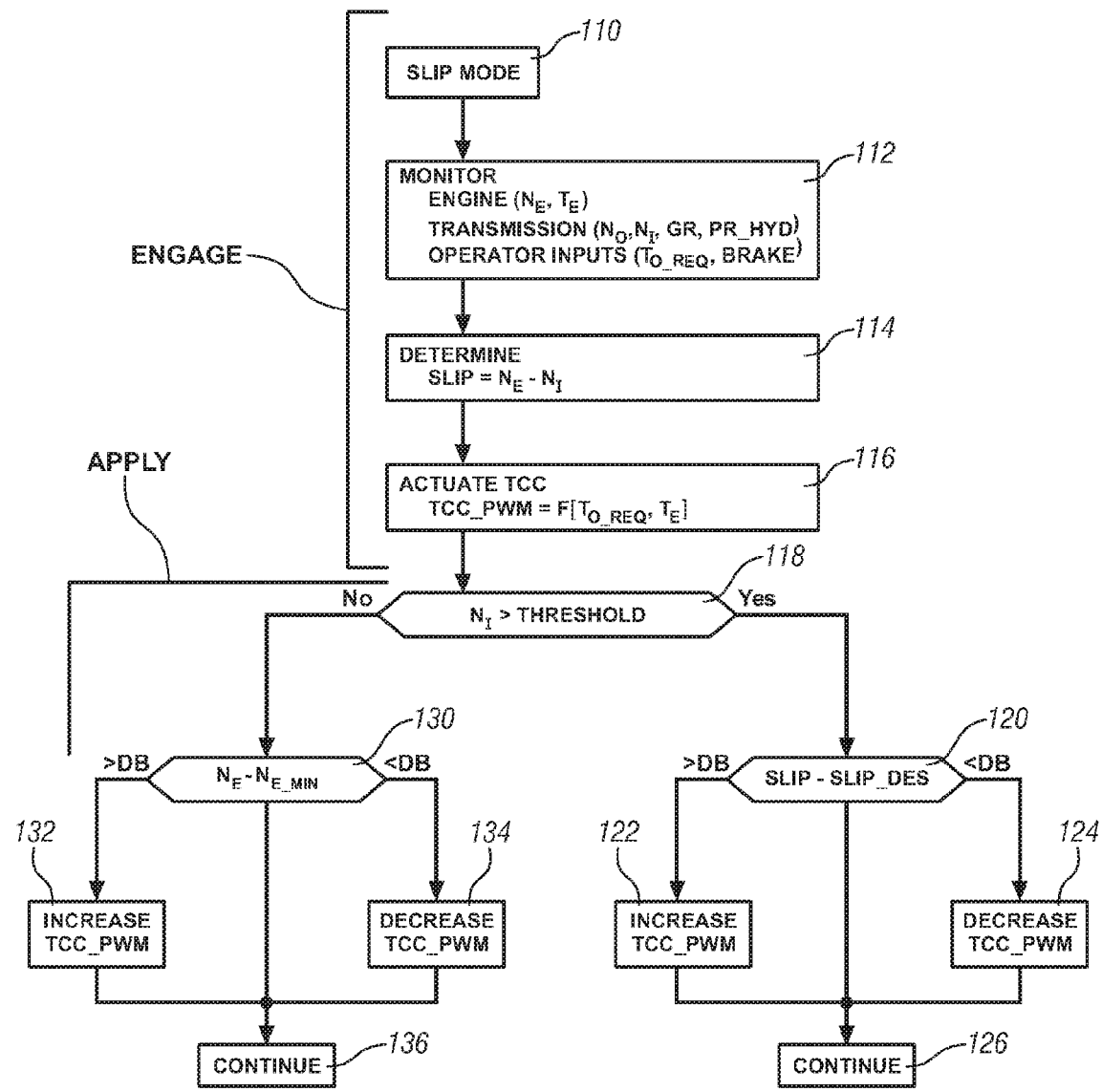
FIG. 2 is an algorithmic flowchart, in accordance with the present invention.

Referring now to FIG. 2, the invention comprises a method, preferably as one or more algorithms which are ongoingly executed primarily in the TCM 15, effective to control actuation and operation of the TCC 25 during ongoing vehicle operation. The method includes determining parametric values for the engine operating point, engine speed, i.e., transmission input speed, and, an operator demand for torque. The TCC is engaged and actuated to a control level, based upon the operator demand for torque and the engine operating point, preferably using a feed-forward control algorithm. When the transmission input speed is less than a threshold, actuation of the clutch device is controlled in a manner effective to maintain the engine speed greater than a minimum speed level. When the transmission input speed is greater than the aforementioned threshold, actuation of the clutch device is controlled effective to maintain slippage across the torque converter substantially at a preset slippage level. This is described in detail hereinafter.

Referring again to FIG. 2, the TCM commands operation in TCC slip mode (Block 110) to engage the TCC 25, typically based upon operating conditions in the engine, transmission and driveline. Operating conditions are monitored (Block 112), typically including engine speed $N_E$, and torque $T_E$, transmission input speed, $N_I$, output speed $N_O$, gear ratio GR, and hydraulic pressure PR_HYD, and operator inputs including operator torque request $T_{O\_REQ}$. Slip across the TCC is determined, based upon a difference between the engine speed $N_E$, and the transmission input speed $N_I$ (Block 114). The TCC is actuated by controlling flow of pressurized hydraulic fluid to engage the TCC to the torque converter using a feed-forward control scheme. The feed-forward control scheme engages the TCC by determining a TCC command. The TCC command is in the form of a PWM control signal, TCC_PWM, based upon the requested torque $T_{O\_REQ}$ and engine torque $T_E$, which is determined from the engine operating point described above (Block 116). The feed-forward control scheme preferably comprises a known control scheme which uses proportional and integral elements in an iterative operation to achieve the determined PWM control signal, TCC_PWM and engage the TCC.

When the TCC is engaged by actuation thereof, the control mode switches to an APPLY mode, wherein the TCC command TCC_PWM is determined based upon the feed-forward control, adjusted using a feedback control scheme as now described. In the APPLY mode, the type of feedback control is determined based upon transmission input speed $N_I$ (Block 118). When the transmission input speed is above a threshold (typically a range of 900 to 1100 rpm), the PWM control signal, TCC_PWM is adjusted based upon magnitude of slippage across the torque converter, determined as shown in block 114. When the transmission input speed is below the threshold, the PWM control signal TCC_PWM is controlled based upon magnitude of engine speed $N_E$. Each feedback control scheme is now described.

When the transmission input speed is below the threshold, actuation of the torque converter clutch is controlled effective to maintain the engine speed greater than a minimum speed level, within an allowable range or deadband (DB). The engine speed $N_E$ is compared to a minimum engine speed, $N_{E\_MIN}$ (Block 130). When the engine speed $N_E$ is greater than the minimum engine speed, $N_{E\_MIN}$, by an amount greater than the deadband, the duty cycle of the PWM control signal TCC_PWM is increased (Block 132) by a fixed amount, e.g. 1%, or by an amount that is determined based upon the difference between the engine speed $N_E$ and the minimum engine speed, $N_{E\_MIN}$. When the engine speed $N_E$ is less than the minimum engine speed, $N_{E\_MIN}$, by an amount greater than the deadband, the duty cycle of the PWM control signal TCC_PWM is decreased (Block 134) by a fixed amount, e.g. 1%, or by an amount that is determined based upon the difference between the engine speed $N_E$ and the minimum engine speed, $N_{E\_MIN}$. The intent of this engine speed control scheme is to control application of the torque converter clutch to maintain engine speed within an allowable range of the minimum speed. The minimum engine speed, $N_{E\_MIN}$ is determined based upon operating characteristics of the engine and transmission including the hydraulic pump. In the application described herein, a parametric value for the minimum engine speed, $N_{E\_MIN}$ is set in the range of 900 to 1100 rpm when operating in the slip mode, in order to provide a sufficient amount of power to the hydraulic pump to have sufficient hydraulic pressure in the transmission for effective operation thereof. Thus, for purposes of illustration, a possible calibration can comprise a parametric value for $N_{E\_MIN}$ of 1000 rpm, with a deadband value of 100 rpm.

When the transmission input speed is above the threshold (Block 118), actuation of the TCC is controlled effective to maintain slippage across the torque converter substantially at a desired slippage level, typically measured as in a difference in rpm ($\Delta$RPM). This includes comparing the determined slip across the TCC to a desired slip, SLIP_DES. (Block 120). A deadband slip, DB, comprising a predetermined hysteresis value of slip (measured in $\Delta$RPM), is included to allow for errors and delays related to mechanical, hydraulic, electrical, and measurement systems operations. When a difference between the determined slip and the desired slip is greater than the deadband slip, the system determines that the slip is greater than desired, and the duty cycle of the PWM control signal TCC_PWM is increased (Block 122) by a fixed amount, e.g. 1%, or by another suitable amount. When the determined slip is less than the desired slip by an amount greater than the deadband slip, the system determines that the slip is less than desired, and the duty cycle of the PWM control signal TCC_PWM is decreased (Block 124) by a fixed amount, e.g. 1%, or by another suitable amount. In this application, a preferred level of slippage is in the range of about 40 to 50 RPM, with a deadband of about 5 RPM. The level of slippage comprises an optimal value, wherein too much slippage can result in loss of engine torque through the torque converter, and too little slippage can result in transmission of unwanted engine or driveline perturbations and resonances to the vehicle chassis and the operator.

Figure 3:
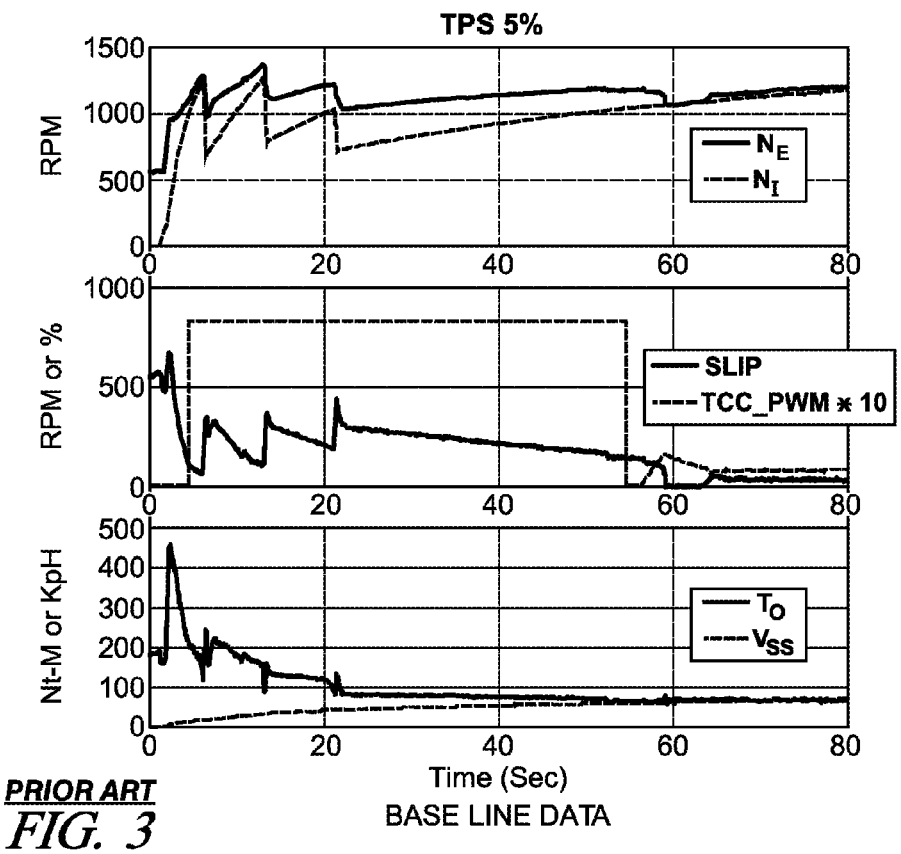
FIG. 3 is a graphical depiction of results from a prior art system.
Figure 4:
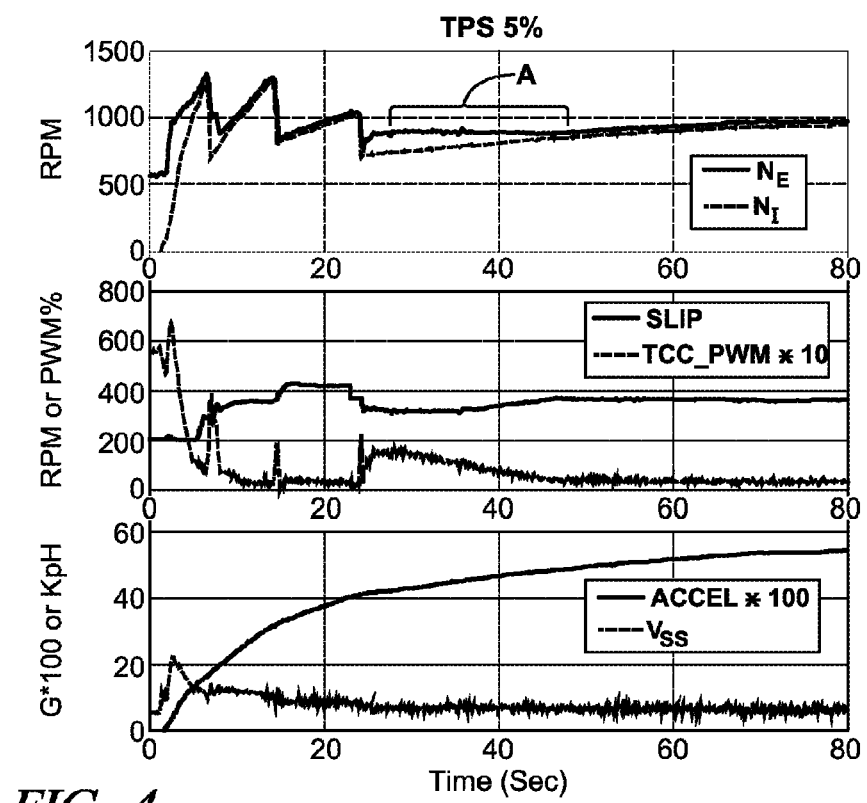
FIG. 4 is a graphical depiction of results, in accordance with the present invention.

Referring now to FIGS. 3-6, graphical depictions of data are presented which demonstrate effectiveness of operating the invention when it is executed as an algorithm in a vehicle system equipped with a four-speed automatic transmission. Each depiction comprises operation during launch of a vehicle, and successive progression through gears 1 through 4, with time-based data comprising engine speed $N_E$ (in RPM), transmission input speed or turbine speed $N_I$ (in RPM), slip (in RPM), PWM control signal TCC_PWM (in percent), transmission output torque $T_O$ (in N-m) and vehicle speed Vss, in kilometers per hour (KpH). FIG. 3 depicts results from a conventional prior art system operated with input of throttle position of 5%, i.e., a low operator demand for acceleration. FIG. 4 depicts a system equipped with an embodiment of the invention, operated similarly to that described with reference to FIG. 3, with operator input of throttle position of 5%. The results demonstrate that the magnitude of slip across the torque converter is substantially less with the embodiment of the invention under these conditions, wherein slip is controlled to a desired slip level of 40 RPM during operation in each of second and third gears. Furthermore, as identified by the area marked as 'A' in FIG. 4, engine operation is maintained at about 900 rpm in fourth gear, and the magnitude of slippage is steadily decreased, thus demonstrating operation of the slip control portion of the algorithm described above.

Figure 5:
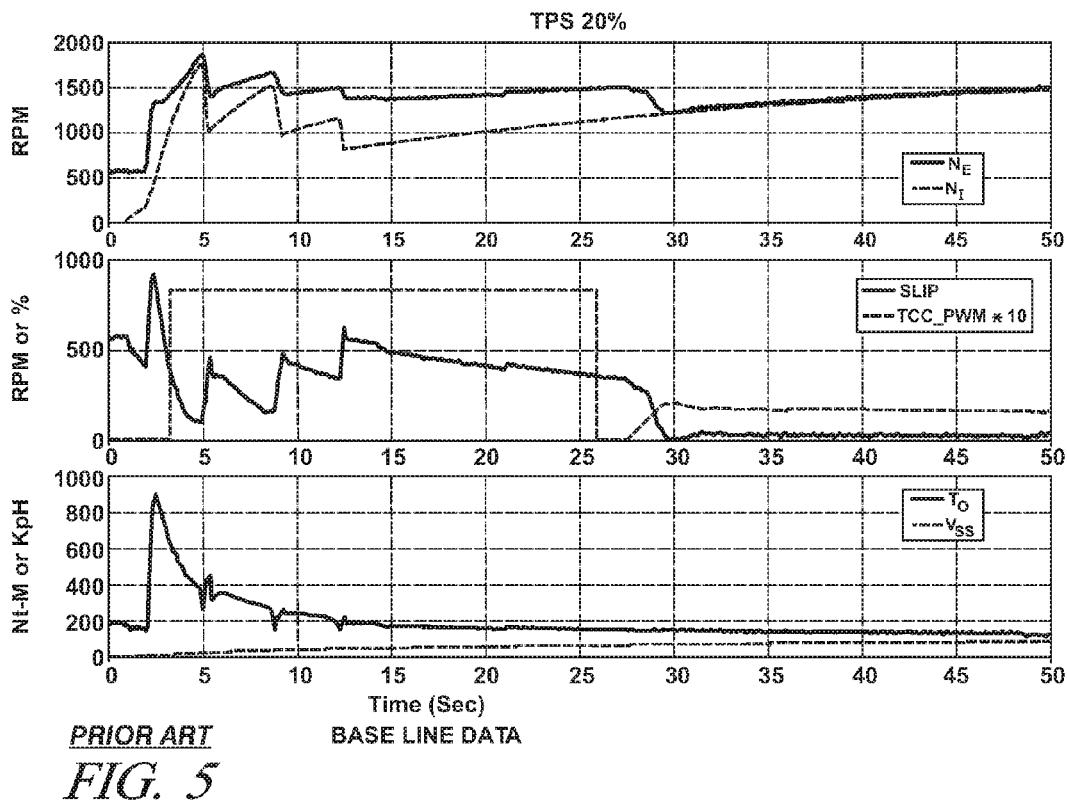
FIG. 5 is a graphical depiction of results from a prior art system.
Figure 6:
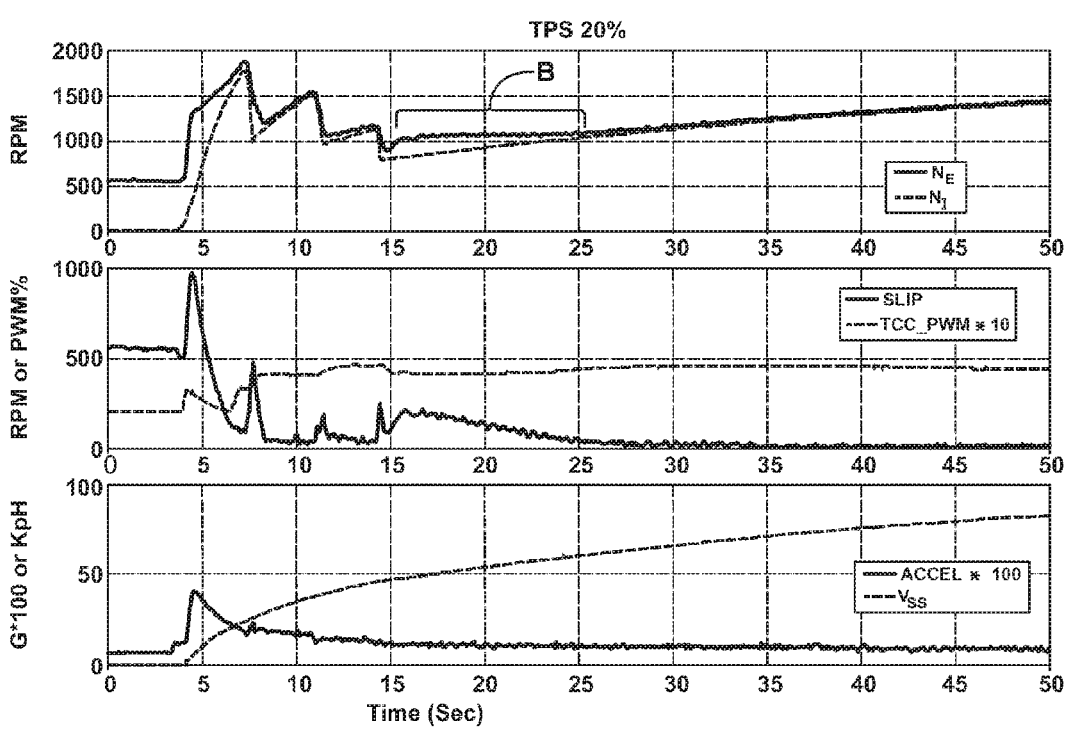
FIG. 6 is a graphical depiction of results, in accordance with the present invention.

FIG. 5 depicts results from a conventional prior art system operated with input of throttle position of 20%, i.e., a moderate operator demand for acceleration. FIG. 6 depicts a system equipped with an embodiment of the invention, with the operator input of throttle position of 20%. The results demonstrate that the magnitude of slip across the torque converter is substantially less with the embodiment of the invention under these conditions, with slip substantially close to the desired slip during operation in each of the second, third and fourth gears. Furthermore, as identified by the area marked as 'B' in FIG. 6, engine operation is maintained at about 1100 RPM in fourth gear, and the magnitude of slippage is steadily decreased to the desired slip, at which time the engine speed begins to increase, again demonstrating operation of the slip control portion of the algorithm described above.

It is understood that modifications in the hardware are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

The invention claimed is:

1. Method for controlling slippage across a torque converter operative to transmit torque from an internal combustion engine to a torque transmission device, comprising:
 monitoring a transmission input speed;
 comparing the monitored transmission input speed to a threshold input speed;
 when the transmission input speed is less than the threshold input speed, controlling an engine speed based upon a minimum engine speed comprising
  comparing the engine speed to the minimum engine speed, and
  controlling actuation of a torque converter clutch device based upon a result of the comparing the engine speed to the minimum engine speed; and
 when the transmission input speed is greater than the threshold input speed, controlling a relative speed across the torque converter based upon a desired relative speed across the torque converter comprising
  comparing the relative speed across the torque converter to the desired relative speed across the torque converter, and
  controlling actuation of the torque converter clutch device based upon a result of the comparing the relative speed across the torque converter to the desired relative speed across the torque converter.

2. The method of claim 1, controlling actuation of the torque converter clutch device based upon a result of the comparing the engine speed to the minimum engine speed comprises decreasing actuation pressure of the torque converter clutch device when the engine speed is substantially less than the minimum engine speed.

3. The method of claim 2, wherein controlling actuation of the torque converter clutch device based upon a result of the comparing the engine speed to the minimum engine speed comprises increasing actuation pressure of the torque converter clutch device when the engine speed is substantially greater than the minimum engine speed.

4. The method of claim 3, wherein the minimum engine speed comprises an engine speed sufficient to provide power to a hydraulic pump for effective hydraulic pressure in the transmission.

5. The method of claim 1, wherein controlling actuation of the torque converter clutch device based upon a result of the comparing the relative speed across the torque converter to the desired relative speed across the torque converter comprises increasing actuation pressure of the torque converter clutch device when the relative speed across the torque converter is substantially greater than the desired relative speed across the torque converter.

6. The method of claim 5, wherein controlling actuation of the torque converter clutch device based upon a result of the comparing the relative speed across the torque converter to the desired relative speed across the torque converter comprises decreasing actuation pressure of the torque converter clutch device when the relative speed across the torque converter is substantially less than the desired relative speed across the torque converter.

7. The method of claim 6, wherein the desired relative speed across the torque converter comprises a fixed parametric difference between engine speed and the transmission input speed.

* * * * *